UNITED STATES PATENT OFFICE.

JONATHAN H. KENYON, OF SEMPRONIUS, NEW YORK.

IMPROVED BEVERAGE.

Specification forming part of Letters Patent No. 53,834, dated April 10, 1866.

*To all whom it may concern:*

Be it known that I, JONATHAN H. KENYON, of Sempronius, Cayuga county, and State of New York, (assignor to myself and RINALDO S. KENYON, of Buffalo, New York,) have invented or discovered a new composition of ingredients forming a new product, constituting a healthy and palatable beverage for common use, which I denominate "Birch Nectar;" and I do hereby delare that the following is a full and exact description thereof.

The ingredients consist of the extract of birch, (*Betula lenta*,) oil of winter-green, (*Gaultheria*,) and whiskey, so compounded as to make a pleasant and healthy beverage for common use.

What I claim as my invention, and desire to secure by Letters Patent, is—

Birch nectar, compounded of the ingredients herein described.

JONATHAN H. KENYON.

Witnesses:
   JULIUS FITTS,
   LUCIUS FITTS.